No. 689,244.  
Patented Dec. 17, 1901.
G. A. TAUER.
TRACTION WHEEL.
(Application filed May 2, 1901.)
(No Model.)  
2 Sheets—Sheet 1.
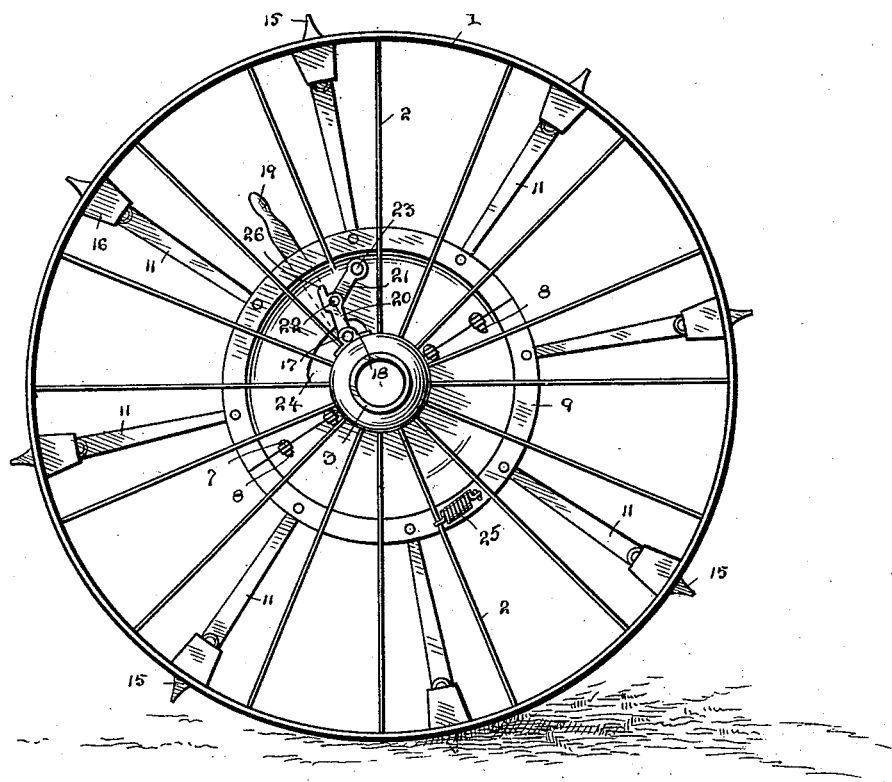
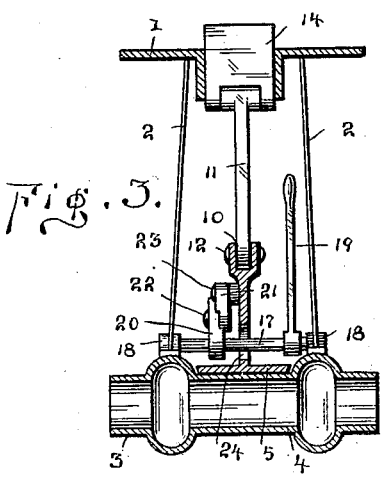
Witnesses  
Inventor  
G. A. Tauer,  
By Victor J. Evans  
Attorney No. 689,244. Patented Dec. 17, 1901.
G. A. TAUER.
TRACTION WHEEL.
(Application filed May 2, 1901.)

(No Model.) 2 Sheets—Sheet 2.

Witnesses
Inventor
G. A. Tauer,
By Victor J. Evans
Attorney

UNITED STATES PATENT OFFICE.

GEORGE A. TAUER, OF NEW ULM, MINNESOTA.

TRACTION-WHEEL.

SPECIFICATION forming part of Letters Patent No. 689,244, dated December 17, 1901.

Application filed May 2, 1901. Serial No. 58,520. (No model.)

*To all whom it may concern:*

Be it known that I, GEORGE A. TAUER, a citizen of the United States, residing at New Ulm, in the county of Brown and State of Minnesota, have invented new and useful Improvements in Traction-Wheels, of which the following is a specification.

This invention relates to traction-wheels, and the object in view is to provide a wheel with a series of retractable claws or mud-hooks adapted, when necessary, to be projected beyond the outer surface of the rim, so as to engage and sufficiently penetrate the ground or soil upon which the wheel is moving to provide the necessary hold and engagement of the wheel on the ground for giving the necessary driving power and preventing the wheel from slipping on soft or muddy soil. When the claws or hooks are not needed, they may be simultaneously retracted or drawn inward within the circumferential plane of the wheel-rim. In connection with the devices for moving the claws or hooks outward and inward I provide means for automatically locking the said claws or hooks in both their outer and inner positions.

With the above objects in view the invention consists in the novel construction, combination, and arrangement of parts hereinafter fully described, illustrated, and claimed.

Figure 3:
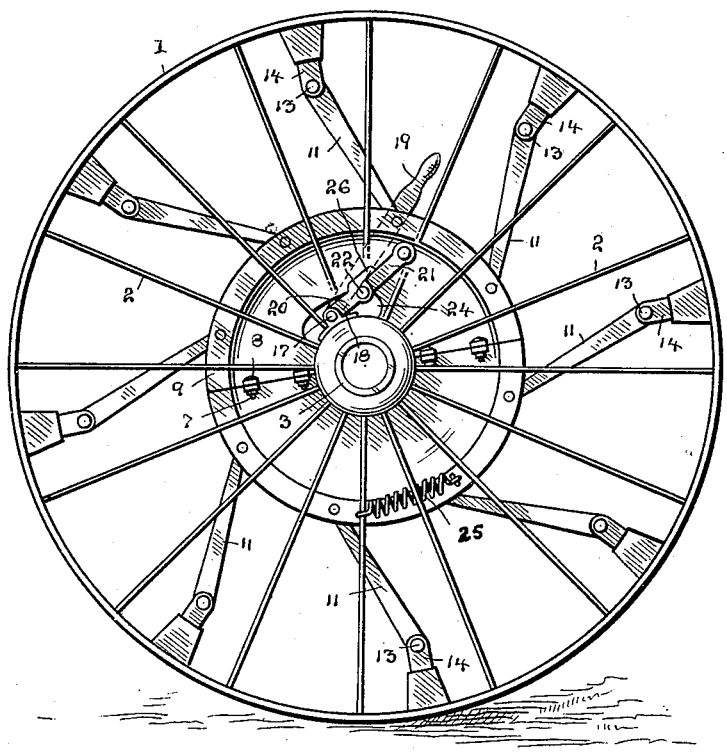
Figure 4:
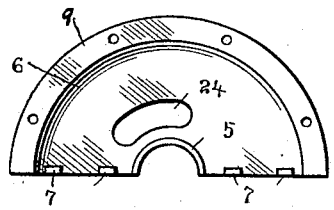

In the accompanying drawings, Figure 1 is a side elevation of a traction-wheel constructed in accordance with the present invention. Fig. 2 is a similar view, partly broken away and showing the claws or hooks drawn inward. Fig. 3 is an enlarged detail radial section through a portion of the wheel, illustrating the claw-operating devices. Fig. 4 is a side elevation of one of the disk-segments.

Like numerals of reference designate like parts in all the figures of the drawings.

Referring to the drawings, 1 designates a wheel-rim of the broad flat type ordinarily employed in traction-engines and other agricultural machinery, the said rim being connected by the usual spokes 2 with the hub 3.

In carrying out the present invention the hub 3 is provided with a cylindrical portion 4 to form a bearing for the hub or sleeve portions or flanges 5 of a pair of disk-segments 6, which are provided at their meeting edges with lugs or ears 7, having openings for the reception of bolts or fasteners 8, by means of which the two disk-segments when brought together upon the hub 3 are held securely together, but left sufficiently loose upon the hub 3 to enable the disk as a whole to be partially revolved upon the hub 3 by means hereinafter described.

The disk 6 has a channeled or double-flanged rim consisting of the parallel or concentric flanges 9, spaced a suitable distance apart to leave a channel or groove 10, in which are received pivotally the inner ends of a series of links 11, the said links being connected to the rim of the disk and between the flanges 9 by means of the bolts or pivots 12. The links 11 are connected at their outer ends by means of pivots 13 to the inner ends of a corresponding series of radially-movable claws or hooks 14, having their outer extremities or edges sharpened or pointed, as at 15. Each of the claws or hooks 14 is substantially rectangular in cross-section and is slidingly mounted within a correspondingly-shaped sleeve or housing 16, connected fixedly to the inner surface of the rim 1 of the wheel and extending radially inward therefrom.

In order to provide for oscillating the disk 6, a rock-shaft 17 is mounted in bearings 18 on the hub 3 and provided with a rigidly-attached claw-operating lever 19. The shaft 17 is connected with the disk 6 by means of a pair of toggle-links 20 and 21, the link 20 being fixedly mounted on the shaft 17 and connected, by means of a pivot 22, with the adjacent end of the link 21, the last-named link being connected by a pivot 23 with the disk 6, at one side thereof, as illustrated in Figs. 1, 2, and 3. To admit of the oscillation of the disk 6, the latter is provided with a segmental slot 24, being of sufficient length to permit the necessary oscillatory movements of the disks.

A holding or retracting spring 25 is connected at one end to one of the wheel-spokes 2 and at its opposite end to the rim of the disk 6, as illustrated in Figs. 1 and 2, the said spring acting in conjunction with the toggle-links 20 and 21 to hold the claws or hooks 15 either in their outward or inward positions. The link 20 is provided beyond its pivot 22 with an extension 26, forming a stop which is adapted to bear against the side of the link 21 when the pivots of the links are brought into alinement with each other, the spring 26 serving to hold the parts in such position and prevent the claws or hooks from accidentally moving outward. In the same manner when the claws or hooks are drawn inward the spring acts to hold the disk in such position as to prevent the claws from being forced inward. It will thus be seen that the claws are held locked in either of the positions to which they may be adjusted.

In operation the claw-operating hand-lever 19, which is located between the spokes 2, where it will be out of the way, is moved in one direction for partially revolving the disk 6, whereupon the latter acts in connection with the links 11 to force the claws or hooks 15 outward to the position illustrated in Fig. 1. By moving the lever 19 in the opposite direction the claws or hooks are drawn inward, and in either position the claws or hooks are held locked by means of the toggle-links 20 and 21, in connection with the tension of the spring 26. Thus the claws or hooks may be brought into use whenever needed, and when not necessary they may be drawn within the circumferential plane of the wheel.

I do not desire to be limited to the details of construction hereinabove set forth, and accordingly reserve the right to change, modify, or vary the construction within the scope of the appended claims.

Having thus fully described my invention, what I claim as new, and desire to secure by Letters Patent, is—

1. A traction-wheel comprising an apertured rim, radially-movable claws mounted therein, an oscillatory disk journaled on the wheel-hub, links connecting the disk and claws, a rock-shaft journaled on the wheel-hub and extending through a segmental slot in the disk, a lever for operating said shaft, and toggle-links connecting said shaft and disk.

2. A traction-wheel comprising an apertured rim, claws movable radially therethrough, an oscillatory disk journaled on the wheel-hub, links connecting the disk and claws, a rock-shaft journaled on the wheel-hub, and toggle-links connecting said shaft and disk and provided with coöperating interlocking shoulders.

In testimony whereof I affix my signature in presence of two witnesses.

GEORGE A. TAUER.

Witnesses:
 ALBERT PFOENDER,
 B. F. WEBBER, Jr.